(12) United States Patent
Bodelin et al.

(10) Patent No.: US 6,332,340 B1
(45) Date of Patent: Dec. 25, 2001

(54) PROCESS FOR MANUFACTURING TECHNICAL GLASS AND BURNER FOR IMPLEMENTING SUCH A PROCESS

(75) Inventors: Pierre Bodelin, Vanves (FR); Patrick Recourt, Marcoussis (JP); Takashi Oguro, Hyogo (JP); Kazuyoshi Nakano, Nagasaki (JP); Toshi Takaha, Nagoya (JP); Hiroyuki Tanaka, Akashi (JP)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 08/985,275

(22) Filed: Dec. 4, 1997

(30) Foreign Application Priority Data

Dec. 26, 1996 (FR) .................................................. 96 16050

(51) Int. Cl.⁷ .................................................. C03B 5/225
(52) U.S. Cl. .................. 65/134.4; 65/136.3; 432/19; 432/20; 431/8; 431/126
(58) Field of Search .................. 65/17.1, 32.5, 65/120, 134.1, 136.3, 134.4, 135.1, 157, 335, 337, 355; 432/19, 20; 431/8, 126

(56) References Cited

U.S. PATENT DOCUMENTS

| | | |
|---|---|---|
| 3,994,665 | * 11/1976 | Young . |
| 4,003,691 | * 1/1977 | Wormser . |
| 4,334,854 | * 6/1982 | Graat et al. ............................... 431/8 |
| 4,373,325 | * 2/1983 | Shekleton ............................ 60/39.06 |
| 4,473,388 | * 9/1984 | Lauwers ............................... 65/134.4 |
| 5,346,524 | * 9/1994 | Shamp et al. . |
| 5,388,985 | * 2/1995 | Musil et al. ............................ 431/116 |
| 5,490,775 | 2/1996 | Joshi et al. . |
| 5,500,030 | * 3/1996 | Joshi et al. ............................ 65/134.4 |
| 5,586,999 | * 12/1996 | Kobayashi . |
| 5,628,809 | * 5/1997 | Kobayashi . |
| 5,755,846 | * 5/1998 | Wagner et al. . |

FOREIGN PATENT DOCUMENTS

| | | |
|---|---|---|
| 195 42 373 | 5/1996 | (DE) . |
| 643262 | 3/1995 | (EP) . |
| 703410 | 3/1996 | (EP) . |
| 763692 | 3/1997 | (EP) . |
| 1441671 | 5/1966 | (FR) . |
| 89/02051 | 3/1989 | (WO) . |
| 91/06804 | 5/1991 | (WO) . |

* cited by examiner

Primary Examiner—Sean Vincent
(74) Attorney, Agent, or Firm—Burns, Doane, Swecker & Mathis, L.L.P.

(57) ABSTRACT

Provided is a process for the manufacture of technical glass. The process includes, heating a glass bath with at least one flame, wherein the at least one flame is a non-hard flame which is blue in color and includes substantially no reducing species.

9 Claims, 2 Drawing Sheets

PROCESS FOR MANUFACTURING TECHNICAL GLASS AND BURNER FOR IMPLEMENTING SUCH A PROCESS

BACKGROUND OF THE INVENTION

1. Field of the Invention

The invention relates to a burner for gas fuels, in particular natural gas.

2. Description of the Related Art

In most industrial furnaces, for example glassmaking furnaces, the transfer of heat to the charge by radiation plays a dominant role. However, this radiative heat transfer depends, on the one hand, on the emissive power of the combustion products and, on the other hand, on their spatial distribution.

In the glassmaking industry, it has been observed that the manufacture of certain glasses in a furnace, for example technical glasses for liquid-crystal displays (LCDs), which are about 1 mm thick, demands quite particular properties of the flame heating the furnace.

Among these properties, it has been observed that, on the one hand, it is preferable to have a flame which preferably comprises substantially no reducing species, such as soot particles and, on the other hand, to have a flame whose emission range is in the wavelength band between about 2 $\mu$m and about 5 $\mu$m, that is to say flames which are blue in colour.

Blue flames fulfil these two conditions. They do not produce soot. Their emission is for the most part due, on the one hand, to the emission from water vapour whose favoured emission range is between 2.2 $\mu$m and 2.8 $\mu$m and, on the other hand, to the emission from carbon dioxide whose emission range is between 2.8 $\mu$m and 3 $\mu$m, as well as between 4 $\mu$m and 5 $\mu$m.

Finally, it has been observed that the heat transfer from a flame may be connected with its momentum. Thus, the higher the momentum of a flame is, the further the heat transfer from this flame is shifted longitudinally downstream.

For manufacturing the aforementioned technical glasses, it has also been observed that a flame having limited (or low) momentum is needed, that is to say a flame which is non-hard, and preferably soft, so as not to overheat the refractory walls of the furnace which face the burner.

FR-A-1,441,671, in the name of the Applicant Company, discloses a variable-flame burner for hydrocarbon gases, in particular natural gas. This known burner has a plurality of tubes which are arranged concentrically so that they respectively form a central duct, an intermediate annular duct and a peripheral annular duct. The central duct and the peripheral duct are fed with an oxidant, and the intermediate annular duct is fed with a fuel, or vice versa.

Even though it was possible to adjust the flame of this burner in order to obtain a blue flame, this flame is only obtained with flames having a high momentum, that is to say hard flames.

SUMMARY OF THE INVENTION

The object of the present invention is to improve the burner of the aforementioned type so that it can produce a "blue" flame with low momentum.

To this end, the invention relates to a burner for gas fuels, in particular natural gas, having three coaxial ducts for feeding gas into a combustion zone, namely a central duct for feeding oxidant, an intermediate annular duct for feeding fuel, and a peripheral annular duct for feeding oxidant, the total oxidant flow rate $Q_o^{TOT}$ being determined by the equation:

$$Q_o^{TOT} = (R^0 + \Delta R) Q_c$$

where $Q_c$ represents the nominal fuel consumption of the burner, $R^0$ is the stoichiometric ratio between the fuel and the oxidant, and R is a stoichiometric excess, characterised in that, with a view to obtaining a blue flame having low momentum, the dimensions of the three ducts satisfy the following equations:

$$25\,(R^0 Q_c)^{1/2} \leq D_1 \leq 62\,(R^0 Q_c)^{1/2}, \tag{i}$$

$$113\,(Q_c)^{1/2} \leq (D_3^2 - D_2^2)^{1/2} \leq 291\,(Q_c)^{1/2}, \tag{ii}$$

$$211\,(Q_o^{TOT})^{1/2} \leq (D_6^2 - D_4^2)^{1/2} \leq 479\,(Q_o^{TOT})^{1/2}, \tag{iii}$$

$$1 \leq D_2 - D_1 / D_1 \leq 20 \tag{iv}$$

$$1 \leq D_5 - D_4 \leq 5 \tag{v}$$

in which equations:

$D_1$ is the diameter of the central duct, $D_2$ is the internal diameter of the intermediate annular duct, $D_3$ is the external diameter of the intermediate annular duct, $D_4$ is the internal diameter of the peripheral annular duct, $D_5$ is the external diameter of the peripheral annular duct, and in that the central duct has a flared wall end making an angle of between 20° and 45°, preferably 40°, with the axis of the burner.

The invention may include one or more of the following characteristics:

- the intermediate annular duct has an internal wall end inclined in the direction of the axis of the burner and making an angle of between 5° and 30°, preferably 25°, with this axis,
- the peripheral annular duct has an internal wall end inclined in the direction of the axis of the burner and making an angle of between 5° and 30°, preferably 25°, with this axis,
- the outlet end of the central duct is set back with respect to the outlet end of the peripheral annular duct by a distance h of between 0 and $1.5 D_1$, preferably equal to $D_1$.

The invention also relates to a process for the manufacture of technical glass, such as glass for liquid-crystal display screens, in which the glass bath is heated with at least one of the flames, characterized in that at least one of the flames is a non-hard flame which is blue in colour, that is to say has an emission spectrum essentially lying between 2 $\mu$m and 5 $\mu$m, and includes substantially no reducing species and in particular soot.

BRIEF DESCRIPTION OF THE DRAWINGS

Other characteristics and advantages of the invention will emerge from the following description which is given by way of non-limiting example, with reference to the appended drawings in which.

DETAILED DESCRIPTION OF THE PREFERRED EMBODIMENTS OF THE INVENTION

Figure 1:
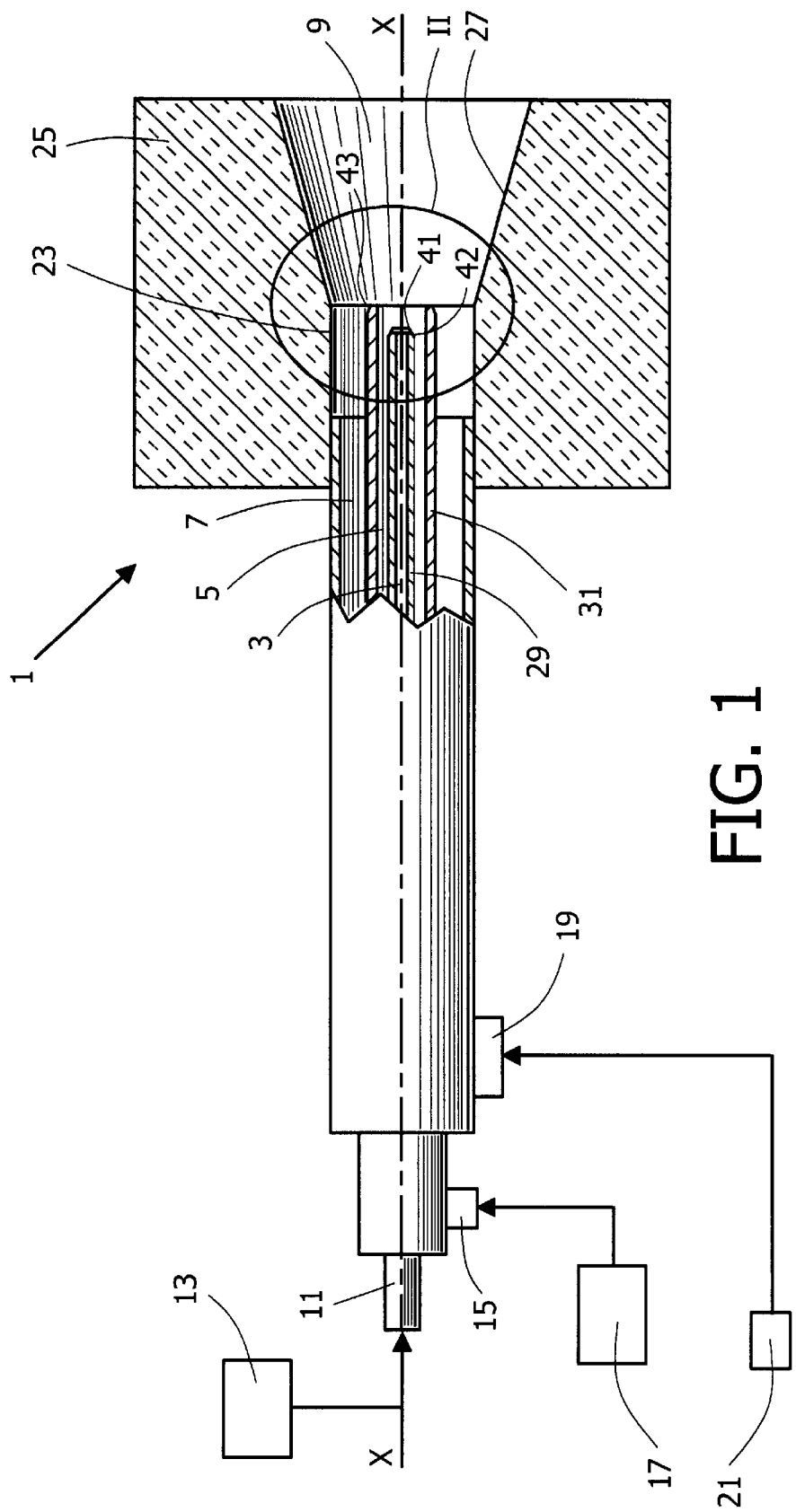
FIG. 1 is a partial sectional view of a burner according to the invention.

FIG. 1 represents a burner 1 according to the invention. This burner 1 comprises three ducts 3, 5 and 7 for feeding gas into a combustion zone 9. These three ducts 3, 5 and 7 are arranged concentrically around an axis X—X of the burner 1.

The duct 3 is connected by its gas inlet end 11 to a component 13 for controlling the flow rate of an oxidant, such as for example oxygen.

The intermediate annular duct 5 comprises an inlet end 15 connected to a component 17 for controlling the flow rate of a fuel, such as for example natural gas.

The peripheral annular duct 7 has an inlet 19 for an oxidant. This duct 7 is supplied by a component 21 for controlling the flow rate of oxidant, such as for example oxygen.

As can be seen in FIG. 1, the burner 1 is introduced into a passage 23, referred to as a tap hole in the glassmaking industry, of a refractory block 25. The passage 23 in the block 25 opens into a flared passage 27 which opens in the direction of the combustion zone 9.

Figure 2:
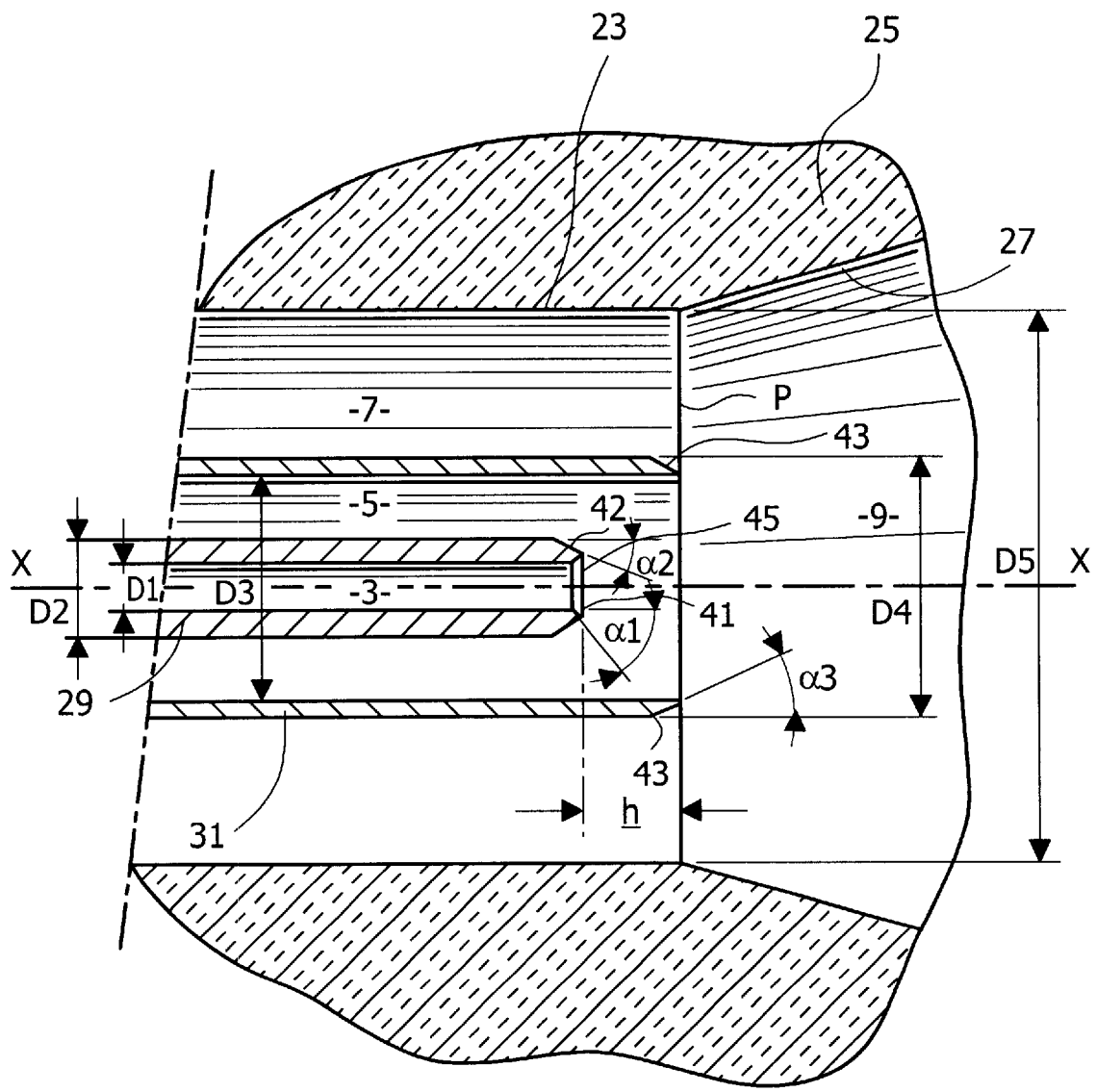
FIG. 2 is a sectional view of a detail II of the burner in FIG. 1.

As can be seen in FIGS. 1 and 2, the outlet ends of the burner are formed, on the one hand, by the passage 23 made in the block 25 and, on the other hand, by two tubes, a central tube 29 and an intermediate tube 31, which are made of refractory steel in order to withstand the heat developed by the combustion process.

As indicated in FIG. 2, the central duct 3 has a diameter $D_1$. The intermediate annular duct 5 has an internal diameter $D_2$ and an external diameter $D_3$. The peripheral annular duct 7 has an internal diameter $D_4$ and an external diameter $D_5$.

In the absence of dilution by inert gases, it is only possible to produce a sootless flame on the condition that the fuel and the oxidant are mixed very quickly and as homogeneously as possible.

To achieve this object, and in order to reduce the momentum needed to produce a "blue" flame, the ends of the tubes 29 and 31 are machined. Thus, the central duct 3 has a flared wall end 41 making an angle $\alpha_1$ of between 20° and 45°, preferably 40°, with the axis X—X of the burner. The end 42 of the internal wall of the duct 5 is inclined in the direction of the axis X—X of the burner. This end 42 makes an angle $\alpha_2$ of between 5° and 30°, preferably 25°, with the axis X—X of the burner. The end 43 of the internal wall of the peripheral annular duct 7 is also inclined in the direction of the axis X—X of the burner. This end 43 makes an angle $\alpha_3$ of between 5° and 30°, preferably 25°, with the axis of the burner.

Furthermore, the outlet end of the peripheral annular duct 7 is arranged in a plane P defined by the junction between the wall of the tap hole 23 and the wall of the flared passage 27 in the refractory block 25. The end 45 of the inner tube 29 defining the outlet end of the central duct 3 is set back by a distance $\underline{h}$ with respect to this plane P.

The burner 1 is designed for a certain nominal power, with which a nominal fuel consumption $Q_c$ of the burner is associated. It is with respect to this nominal flow rate $Q_c$ that the various dimensions $D_1$ to $D_5$ of the burner are fixed.

In order to produce a "blue" flame, it is necessary for the oxidant supply to be greater than or equal to the stoichiometric quantity needed to burn all the fuel supplied to the combustion zone. The total oxidant flow rate $Q_o^{TOT}$ is then determined by the equation $$Q_o^{TOT} = (R^0 + \Delta R)Q_c$$

where $R^0$ is the stoichiometric ratio between the fuel and the oxidant and R is a stoichiometric excess which is defined in advance by the glass manufacturing application in which the burner is used.

In order to produce a blue flame having a low momentum, the applicant company determined by calculation the following relationships between the various dimensions $D_1$ to $D_5$:

$$25\ (R^0 Q_c)^{1/2} \leq D_1 \leq 62\ (R^0 Q_c)^{1/2}, \tag{i}$$

$$113\ (Q_c)^{1/2} \leq (D_3^2 - D_2^2)^{1/2} \leq 291\ (Q_c)^{1/2}, \tag{ii}$$

$$211\ (Q_o^{TOT})^{1/2} \leq (D_5^2 - D_4^2)^{1/2} \leq 479\ (Q_o^{TOT})^{1/2}, \tag{iii}$$

$$1 \leq \frac{D_2 - D_1}{D_1} \leq 20 \tag{iv}$$

$$1 \leq \frac{D_5 - D_4}{D_1} \leq 5. \tag{v}$$

This burner operates in an environment at very high temperature (about 1600° C.) with no cooling other than that due to the fuel and oxidant fluids. With this burner, a "blue" flame having low momentum is obtained which is therefore less likely to overheat the refractory walls which face the burner.

What is claimed is:

1. A process for the manufacture of technical glass, comprising heating a glass bath with at least one flame, wherein at least one of the at least one frame is a non-hard flame which is blue in color and includes no reducing species and;

feeding gas from a source into a combustion zone having a central duct for feeding oxidant and having a diameter $D_1$, an intermediate annular duct for feeding fuel and having an internal diameter $D_2$ and a peripheral annular duct for feeding oxidant and having an internal diameter $D_5$, said ducts being disposed in a coaxial arrangement, wherein an outlet end of said central duct is set back with respect to the outlet end of said peripheral annular duct by a distance h of between 0 and $1.5 D_1$.

2. The process according to claim 1, wherein the technical glass is a glass for liquid-crystal display screens.

3. The process according to claim 1, wherein the emission spectrum of the blue flame is essentially between 2 $\mu$m and 5 $\mu$m.

4. The process according to claim 1, wherein said intermediate annular duct has an internal wall end inclined in a direction of the axis of said burner and making and angle of between 5° and 30°.

5. The process according to claim 1, wherein the peripheral annular duct has an internal wall inclined in the direction of the axis of the burner and making an angle of between 5° and 30°.

6. The process according to claim 1, wherein the central duct has a flared wall end making an angle of about 20° and 45° with the axis of the burner.

7. The process according to claim 1, wherein an end of the internal wall of said intermediate annular duct is between 5° and 30° with the axis of the burner.

8. The process according to claim 1, wherein an end of the internal wall said peripheral annular duct is between 5° and 30° with the axis of the burner.

9. A process for the manufacture of technical glass, comprising heating a glass bath with at least one flame, wherein at least one of the at least one flame is a non-hard blue flame which is free of reducing species, and supplying an oxidant in an equal or greater stoichiometric quantity than needed to burn all the fuel supplied to form said non-hard blue flame and;

feeding gas from a source into a combustion zone having a central duct for feeding oxidant and having a diameter $D_1$, an intermediate annular duct for feeding fuel and having an internal diameter $D_2$ and a peripheral annular duct for feeding oxidant and having an internal diameter $D_5$, said ducts being disposed in a coaxial arrangement, wherein an outlet end of said central duct is set back with respect to the outlet end of said peripheral annular duct by a distance h of between 0 and $1.5D_1$.

* * * * *